US010081219B2

(12) United States Patent
Tomimatsu et al.

(10) Patent No.: US 10,081,219 B2
(45) Date of Patent: Sep. 25, 2018

(54) TRACTOR

(71) Applicant: KUBOTA CORPORATION, Osaka (JP)

(72) Inventors: Daisuke Tomimatsu, Osaka (JP); Tatsuyuki Kashimoto, Osaka (JP); Yutaka Inubushi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/105,844

(22) PCT Filed: Mar. 19, 2015

(86) PCT No.: PCT/JP2015/058207
§ 371 (c)(1),
(2) Date: Jun. 17, 2016

(87) PCT Pub. No.: WO2015/146768
PCT Pub. Date: Oct. 1, 2015

(65) Prior Publication Data
US 2017/0129284 A1 May 11, 2017

(30) Foreign Application Priority Data

Mar. 28, 2014 (JP) .................................. 2014-069070

(51) Int. Cl.
*B60B 35/00* (2006.01)
*B62D 21/18* (2006.01)
*B62D 49/00* (2006.01)
*B60B 35/16* (2006.01)

(52) U.S. Cl.
CPC .......... *B60B 35/005* (2013.01); *B60B 35/006* (2013.01); *B62D 21/186* (2013.01); *B62D 49/00* (2013.01); *B60B 35/163* (2013.01); *B60B 35/166* (2013.01); *B60Y 2200/221* (2013.01); *B60Y 2410/124* (2013.01)

(58) Field of Classification Search
CPC .... B60B 35/005; B62D 21/186; B62D 49/00; B60Y 2200/221; B60G 9/027; B60G 9/02
USPC ................... 280/781, 124.109; 180/311, 312
See application file for complete search history.

(56) References Cited

U.S. PATENT DOCUMENTS 6,158,525 A    12/2000  Inoue
2010/0288223 A1*  11/2010  Huenink ................ B62D 21/11
                                                123/195 C

FOREIGN PATENT DOCUMENTS

| JP | 53-79601    | * | 3/1978  |
| JP | 53-79601    |   | 7/1978  |
| JP | 11-310151   |   | 11/1999 |
| JP | 2000-038742 |   | 2/2000  |

(Continued)

OTHER PUBLICATIONS

International Search Report issued in Japanese Patent Application No. PCT/JP2015/058207, dated May 26, 2015.

*Primary Examiner* — Keith J Frisby
(74) *Attorney, Agent, or Firm* — Greenblum & Bernstein, P.L.C.

(57) ABSTRACT

To obtain a front axle frame having a high degree of strength appropriate to heavy load tasks, without resulting in a decrease in productivity or a drastic rise in costs. In a tractor that includes a front axle frame supporting a front axle case, the front axle frame is configured by a cast metal member having a support portion on a bottom of the front axle frame, the support portion supporting the front axle case.

4 Claims, 7 Drawing Sheets

(56) References Cited

FOREIGN PATENT DOCUMENTS

| JP | 2000-038742 | * | 8/2000 |
|----|-------------|---|--------|
| JP | 2013-136359 |   | 7/2013 |

* cited by examiner

TRACTOR

FIELD OF THE INVENTION

The present invention relates to a tractor having a front axle frame supporting a front axle case.

BACKGROUND OF THE INVENTION

In a tractor as described above, a front axle frame (front frame) has been configured by welding left and right side members (first members) composed of a steel strip or sheet to a cross member (second member) composed of a steel strip or sheet (see, for example, Patent Literature 1).

RELATED ART

Patent Literature

Patent Literature 1: Japanese Patent Laid-Open Publication No. 2013-136359 (paragraph [0019], FIGS. 1 to 7)

SUMMARY OF THE INVENTION

Problems to be Solved by the Invention

In the above configuration, there is a risk of cracks developing in welded portions between the side members and the cross member during overload tasks in which heavy load tasks such as bulldozing and towing are performed over an extended period of time. Under these circumstances, in order to obtain a degree of strength capable of withstanding the heavy load tasks, a plurality of reinforcement members could be welded to the front axle frame. However, such a case may result in a decrease in productivity and a drastic rise in costs due to increasing a number of components and number of steps in welding.

The present invention obtains a front axle frame having a high degree of strength appropriate to heavy load tasks, without resulting in a decrease in productivity or a drastic rise in costs.

Means for Solving the Problems

In a tractor that includes a front axle frame supporting a front axle case, the front axle frame is configured by a cast metal member having a support portion on a bottom of the front axle frame, the support portion supporting the front axle case.

According to this aspect, the front axle frame is configured by a cast metal member having a bottom panel, which readily ensures a high degree of strength. Therefore, in comparison to a case using a structure welding together steel strips or sheets, for example, a high degree of strength can be obtained with a small number of components and without requiring the time and effort of welding.

In particular, by concentrating innovation in a shape which, for example, increases a thickness of a location requiring a high degree of strength, that requirement can be readily handled without resulting in an increase in the number of components and number of steps in welding due to increasing the reinforcement members to be welded.

In addition, because there are no welded portions as in a welded structure, a risk of cracks developing in the welded portions can be avoided during overload tasks in which heavy load tasks such as bulldozing and towing are performed over an extended period of time.

Accordingly, a front axle frame can be obtained having a high degree of strength appropriate to heavy load tasks, while increasing productivity and reducing costs by reducing the number of components and eliminating a welding process.

Another aspect improving the suitability of the present invention is that the front axle frame is made of cast metal.

According to this aspect, a weight of the front axle frame can be increased as compared to a front axle frame obtained with a structure welding together steel strips and sheets.

As a result, an increase to the weight of the vehicle appropriate to heavy load tasks such as bulldozing and towing can be achieved while reducing a number of balance weights provided.

Another aspect improving the suitability of the present invention is that the front axle case includes a front/back-oriented support shaft rotatably supported by front and rear holders. The front axle frame is long in a front/back direction, spanning the front and rear holders, and includes the support portions at both the front and rear of the front axle frame. The front axle frame is configured to support the front axle case with the front and rear support portions, via the front and rear holders.

According to this aspect, the front axle frame can be configured to be long at least in the front/back direction, spanning the front and rear holders.

Accordingly, an increase to the weight of the vehicle appropriate to heavy load tasks such as bulldozing and towing can be achieved while reducing a number of balance weights provided.

MODE FOR CARRYING OUT THE INVENTION

In the following, an example of an embodiment of the present invention is described with reference to the drawings.

Figure 1:
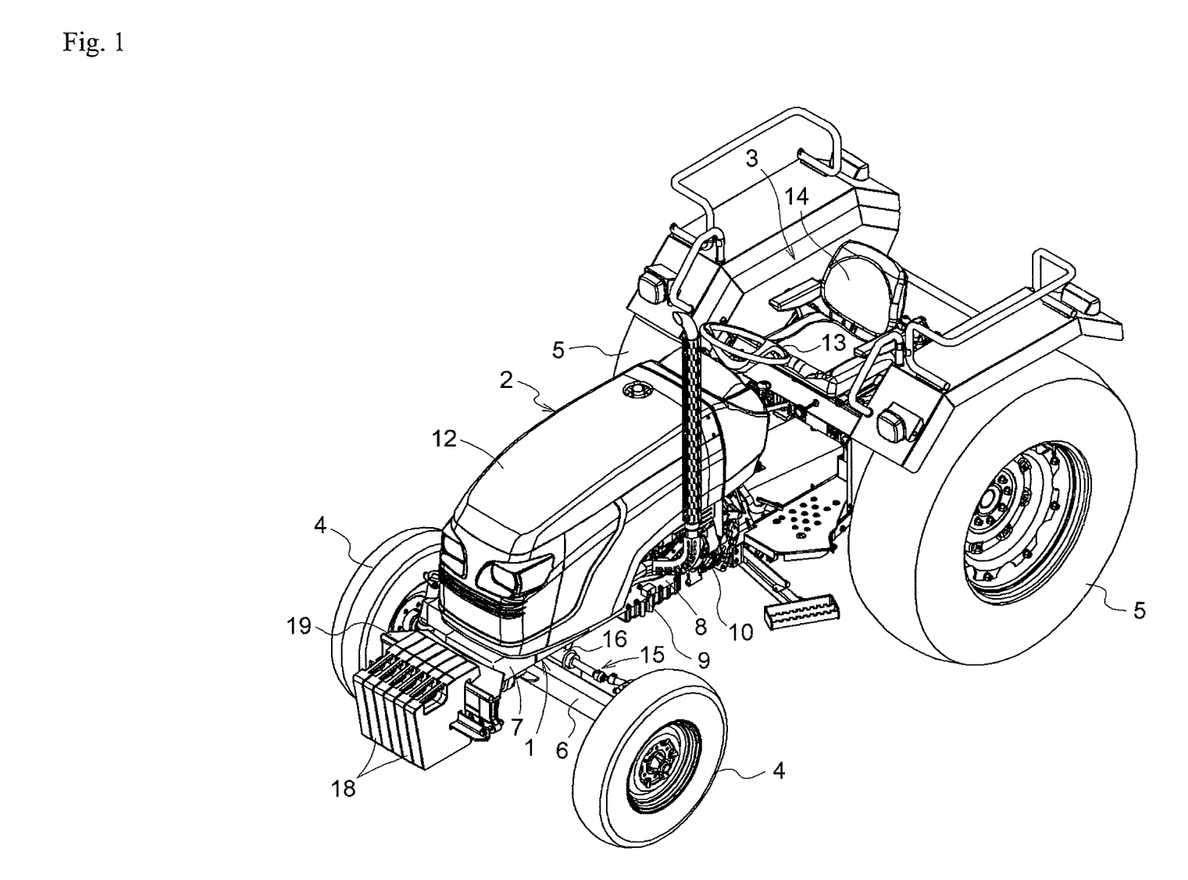
FIG. 1 is a perspective view of a tractor.
Figure 2:
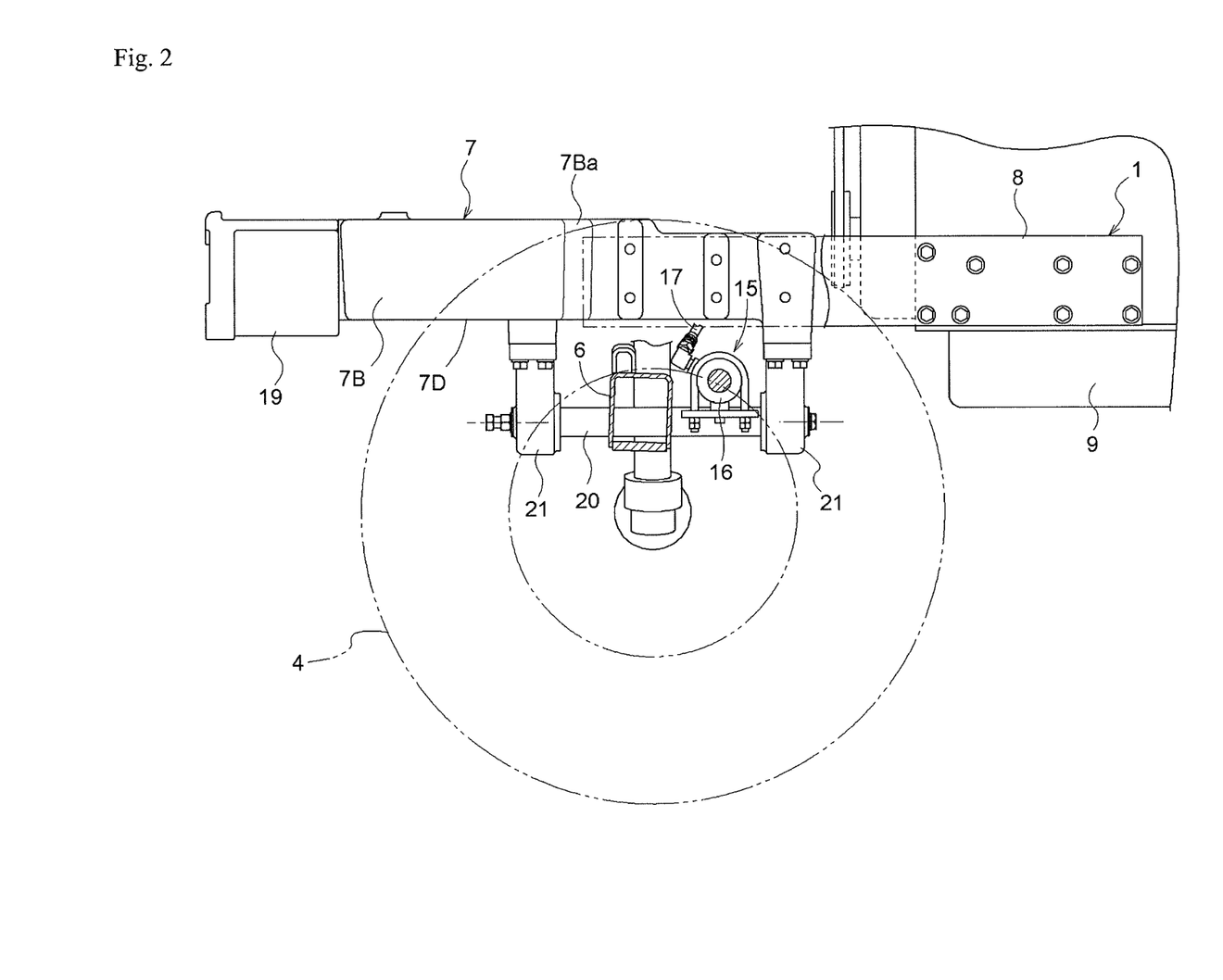
FIG. 2 is a vertical cross-section of a left lateral view of a relevant portion illustrating a configuration of a front axle frame, for example.
Figure 3:
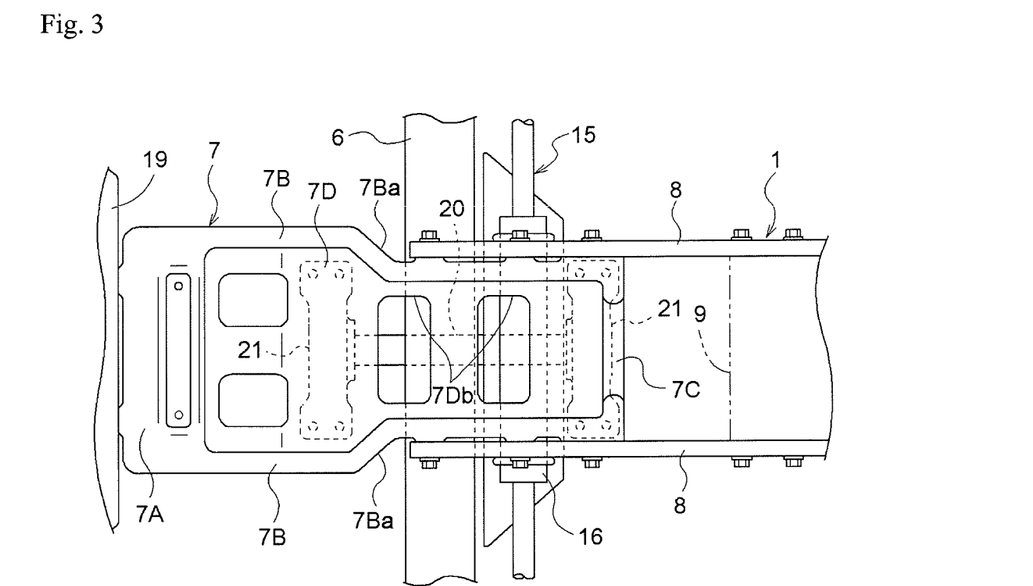
FIG. 3 is a plan view of a relevant portion illustrating the configuration of the front axle frame, for example.
Figure 4:
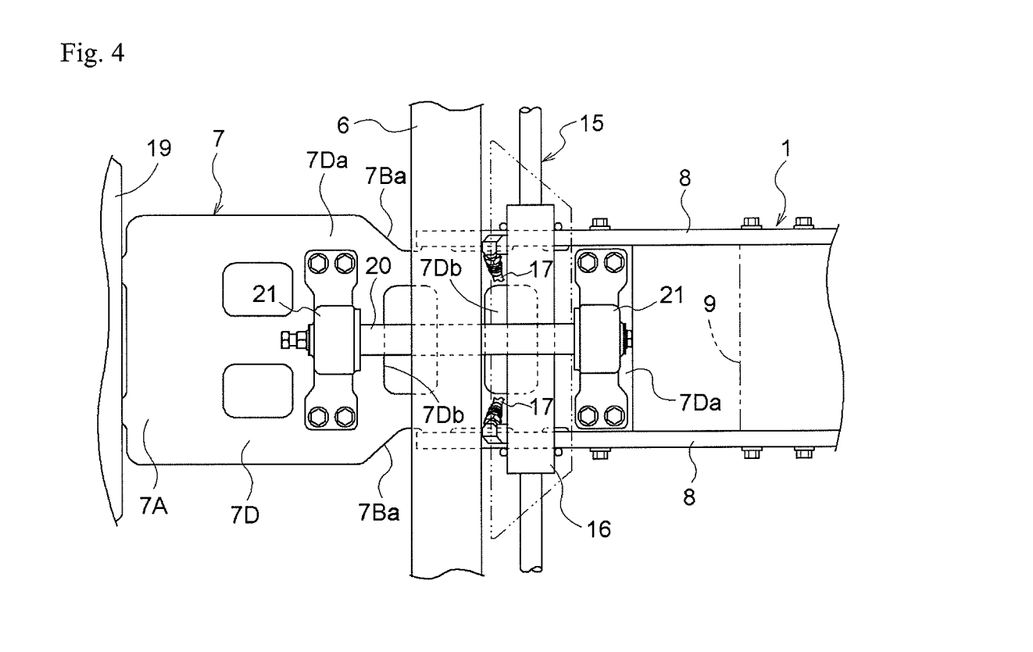
FIG. 4 is a bottom view of a relevant portion illustrating the configuration of the front axle frame, for example.
Figure 5:
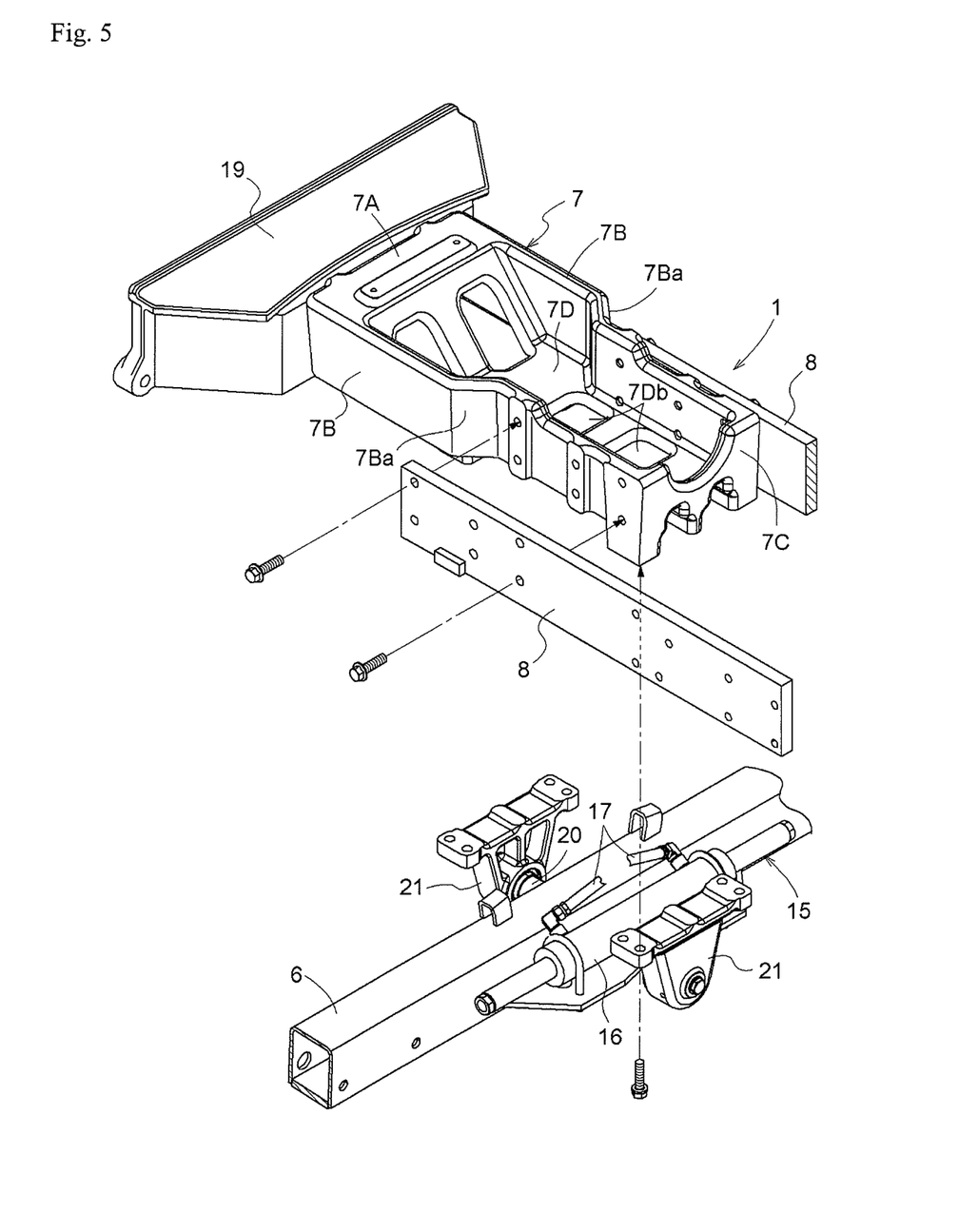
FIG. 5 is an exploded perspective view of a relevant portion illustrating the configuration of the front axle frame, for example.

As shown in FIG. 1, an exemplary tractor in the present embodiment includes a motor portion 2 in a front half of a vehicle body frame 1, and a cockpit 3 in a rear half of the vehicle body frame 1. In addition, front wheels 4 (drivable steered wheels) are arranged on a left and right of the motor portion 2 and rear wheels 5 (brake-enabled drive wheels) are provided on the left and right of the cockpit 3, configuring a four-wheel drive model.

As shown in FIGS. 1 to 5, the vehicle body frame 1 is configured such that a water-cooled upright diesel engine (hereafter referred to as an engine) 9 is connected via left and right side members 8 (each configured by a steel strip) to a rear portion of a front axle frame 7 supporting a front axle case 6, and such that a cast metal housing unit 10 is connected to a bottom portion of the engine 9.

The motor portion 2 is configured by providing the engine 9 and the like in an engine compartment, which is formed by a hood 12 and the like. The cockpit 3 includes a steering wheel 13 for front wheel steering, a driver's seat 14 capable of adjusting a position of the seat 14 in a front/back direction, and the like. The steering wheel 13 is linked to the left and right front wheels 4 via a total hydraulic power steering apparatus 15 or the like. The power steering apparatus 15 is configured by, for example, a double action steering cylinder 16 for front wheel steering, which is attached to a rear portion of the front axle case 6; a control unit (not shown in the drawings) controlling a flow of oil to the steering cylinder 16 in accordance with operation of the steering wheel 13; and a pair of hydraulic hoses 17 connecting the steering cylinder 16 and the control unit.

As shown in FIGS. 2 to 5, the front axle frame 7 is configured by a cast metal member formed in the shape of a frame having a bottom panel, the front axle frame 7 including a front wall 7A, left and right side walls 7B, a rear wall 7C, and a bottom 7D, for example. Specifically, the front axle frame 7 is configured by a cast metal member having a bottom panel, which readily ensures a high degree of strength. Therefore, in comparison to a case using a structure welding together steel strips or sheets, a high degree of strength can be obtained with a small number of components and without requiring the time and effort of welding. In addition, because there are no welded portions as in a welded structure, a risk of cracks developing in the welded portions can be avoided during overload tasks in which heavy load tasks such as bulldozing and towing are performed over an extended period of time. Also, a weight of the front axle frame 7 can be increased, thus facilitating an increase to the weight of a vehicle appropriate to heavy load tasks such as bulldozing and towing.

As shown in FIGS. 1 to 5, the front wall 7A of the front axle frame 7 is configured at a coupling location where a weight support member 19 enabling a balance weight 18 to be added or removed is bolt-coupled. The weight support member 19 is configured by cast metal. Specifically, a weight of the weight support member 19 can be increased, thus further facilitating an increase to the weight of the vehicle appropriate to heavy load tasks such as bulldozing and towing.

Each of the side walls 7B of the front axle frame 7 are configured at coupling locations where a rear half of each of the side walls 7B is bolt-coupled to a front half of the corresponding side member 8. In addition, the side walls 7B of the front axle frame 7 are formed in a shape having a stepped portion 7Ba, the stepped portion 7Ba creating a left/right spacing at the front half of each of the side walls 7B larger than the left/right spacing at the rear half of each of the side walls 7B so as to prevent an exterior surface of each of the side members 8 from projecting past an exterior surface of the front half of each of the side walls 7B.

The bottom 7D of the front axle frame 7 includes front and rear support portions 7Da supporting the front axle case 6 on both front and rear ends of the bottom 7D. The bottom 7D also includes two front and rear hydraulic pipe openings 7Db between the front and rear support portions 7Da. The front and rear support portions 7Da are configured at coupling locations where front and rear holders 21 are bolt-coupled, the holders 21 rotatably supporting a front/back-oriented support shaft 20 which is provided to the front axle case 6. Specifically, the front axle frame 7 is configured such that the front axle case 6 is supported so as to be capable of rolling, and is supported by the front and rear support portions 7Da provided to the bottom 7D, via the front/back-oriented support shaft 20 and the front and rear holders 21. Also, the front axle frame 7 can be configured such that at least the bottom 7D is long in the front/back direction, spanning the front and rear holders, thus further facilitating an increase to the weight of the vehicle appropriate to heavy load tasks such as bulldozing and towing.

The rear hydraulic pipe opening 7Db is formed so as to be positioned above the steering cylinder 16, which is attached to the rear portion of the front axle case 6. In addition, the opening 7Db is formed to have a rectangular shape in a plan view, of a size enabling a task of connecting a hydraulic hose 17 from above the front axle frame 7 to the steering cylinder 16 positioned below the front axle frame 7.

In a case where the steering cylinder 16 is attached to the front portion of the front axle case 6, the front hydraulic pipe opening 7Db is formed so as to be positioned above the steering cylinder 16. In addition, the opening 7Db is formed to have a rectangular shape in a plan view, of a size enabling the task of connecting the hydraulic hose 17 from above the front axle frame 7 to the steering cylinder 16 positioned below the front axle frame 7.

Although omitted from the drawings, an independent dual clutch enabling an operation interrupting drive power for travel and an operation interrupting drive power for work; a gear-type main speed change device speed-changing the drive power for travel; a gear-type auxiliary speed change device speed-changing the drive power after the drive power has been speed-changed by the main speed change device; and a rear wheel differential gear, for example, are provided in an interior of the housing unit 10.

In this regard, in a case where a high horsepower engine 9 appropriate to heavy load tasks such as bulldozing and towing is provided, a need arises to employ a broad transmission gear or the like having a high degree of strength, which is capable of withstanding the high horsepower. Therefore, an overall length of a transmission system installed in the housing unit 10 increases, necessitating that an overall length of the housing unit 10 be increased. In addition, a need arises to increase the strength of the housing unit 10 for use with the high horsepower.

Conversely, in a case where a low horsepower engine 9 appropriate to light load tasks such as tilling is provided, a narrow transmission gear or the like for low horsepower can be employed. Therefore, the overall length of the transmission system installed in the housing unit 10 decreases, necessitating that the overall length of the housing unit 10 be decreased. In addition, a need arises to reduce the weight of the housing unit 10 for use with the low horsepower.

Also, in cases where the housing unit 10 for heavy load tasks and the housing unit 10 for light load tasks are each cast using dedicated die molds, tooling costs may rise.

Under these circumstances, the housing unit 10 is configured as follows.

Figure 6:
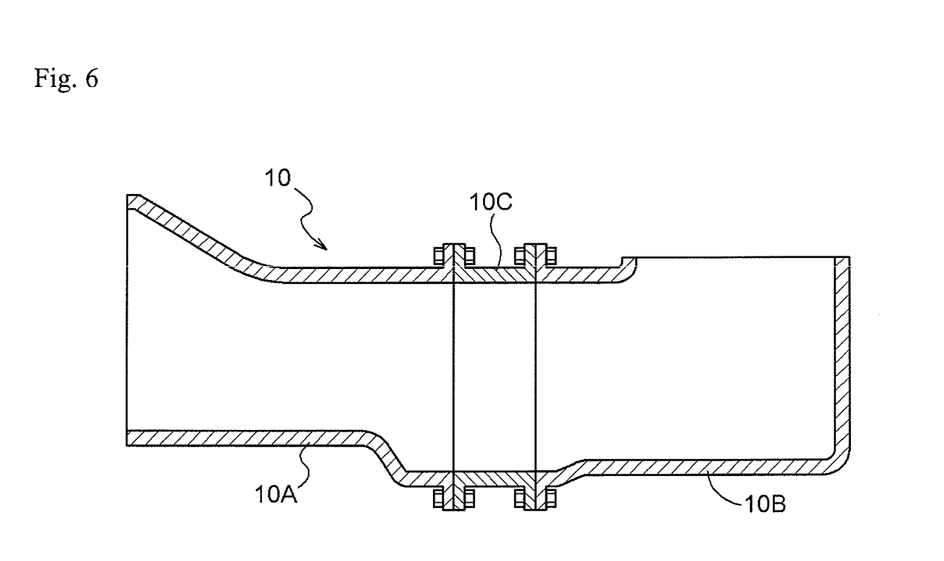
FIG. 6 is a schematic vertical cross-section of a left lateral view illustrating a configuration of a housing unit for heavy load tasks.
Figure 7:
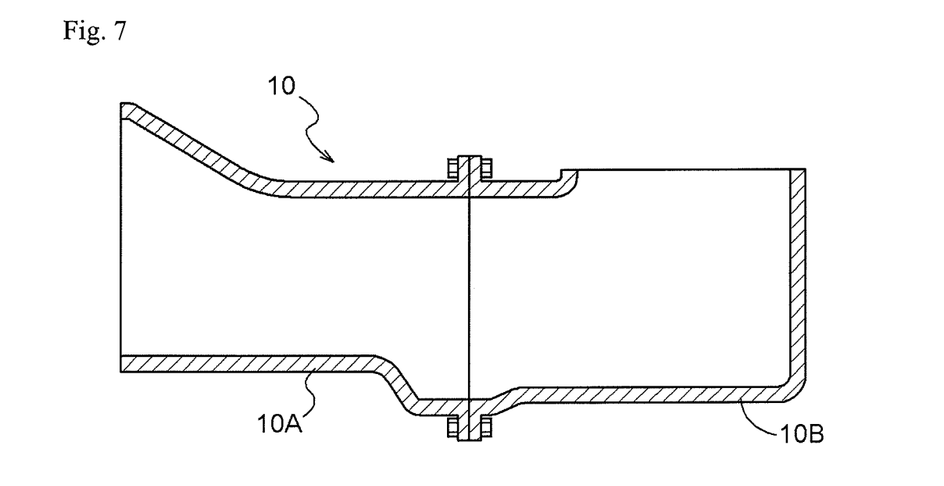
FIG. 7 is a schematic vertical cross-section of a left lateral view illustrating another configuration of a housing unit for heavy load tasks.

As shown in FIGS. 6 and 7, the housing unit 10 for heavy load tasks used by the present tractor is configured to heavy load specifications, in which the total length is long, appropriate to heavy load tasks such as bulldozing and towing, by bolt-coupling a front housing 10A in which the dual clutch as well as the main and auxiliary speed change devices and the like are installed; a rear housing 10B in which the rear wheel differential gear and the like are installed; and a middle housing 10C interposed between the front housing 10A and the rear housing 10B. In addition, in order to ensure a high degree of strength and heavy weight appropriate to heavy load tasks such as bulldozing and towing, each of the housings 10A to 10C are cast so as to have an overall thick wall thickness. Also, forming each of the housings 10A to 10C such that a coupling structure between the front housing 10A and the middle housing 10C and a coupling structure between the rear housing 10B and the middle housing 10C are the same enables the front housing 10A and the rear housing 10B to be bolt-coupled together. With such a coupling, the overall length of the housing unit 10 can be reduced, enabling use with models having a short wheel base.

Figure 8:
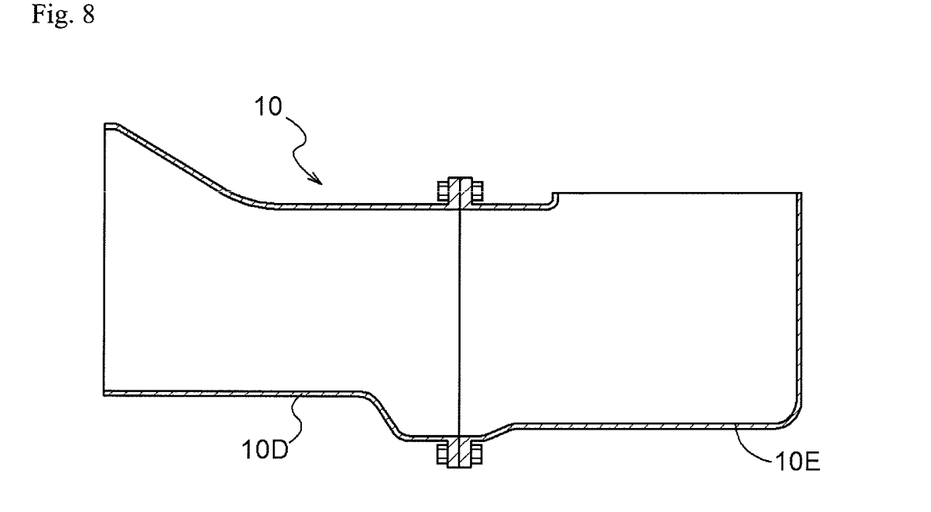
FIG. 8 is a schematic vertical cross-section of a left lateral view illustrating a configuration of a housing unit for light load tasks.

As shown in FIG. 8, the housing unit 10 for light load tasks is configured to light load specifications, in which the total length is short, appropriate to light load tasks such as tilling, by bolt-coupling a front housing 10D for light load tasks, which has an exterior shape and coupling structure formed identically to those of the front housing 10A for heavy load tasks, to a rear housing 10E for light load tasks, which has an exterior shape and coupling structure formed identically to those of the rear housing 10B for heavy load tasks. In addition, in order to achieve a weight reduction appropriate to light load tasks such as tilling, each of the housings 10D and 10E are cast so as to have an overall thin wall thickness.

Specifically, in the case of casting the front housing 10A for heavy load tasks and in the case of casting the front housing 10D for light load tasks, the same primary mold for a front housing can be used. Also, the same primary mold for a rear housing can be used in the case of casting the rear housing 10B for heavy load tasks and in the case of casting the rear housing 10E for light load tasks. Accordingly, tooling costs can be reduced as compared to a case where separate, dedicated heavy load task primary molds and light load task primary molds are also used in addition to a nesting piece, core piece, and the like.

Figure 9:
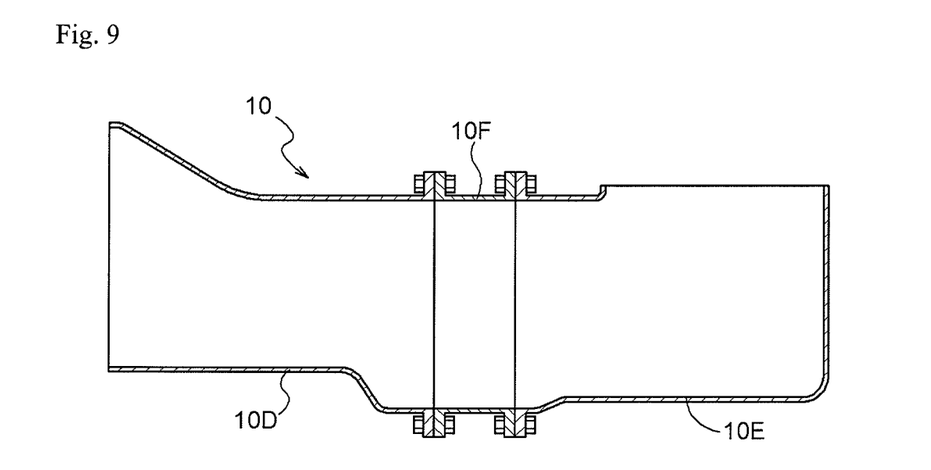
FIG. 9 is a schematic vertical cross-section of a left lateral view illustrating another configuration of a housing unit for light load tasks.

As shown in FIG. 9, an example of the housing unit 10 for light load tasks may be a housing unit configured so as to include a middle housing 10F having a thin wall thickness for light load tasks, and which has an exterior shape and coupling structure formed identically to those of the middle housing 10C for heavy load tasks. With this configuration, the same primary mold for a middle housing can be used in the case of casting the middle housing 10C for heavy load tasks and in the case of casting the middle housing 10F for light load tasks. Also, the middle housing 10F can be used on models having a long wheel base.

Figure 10:
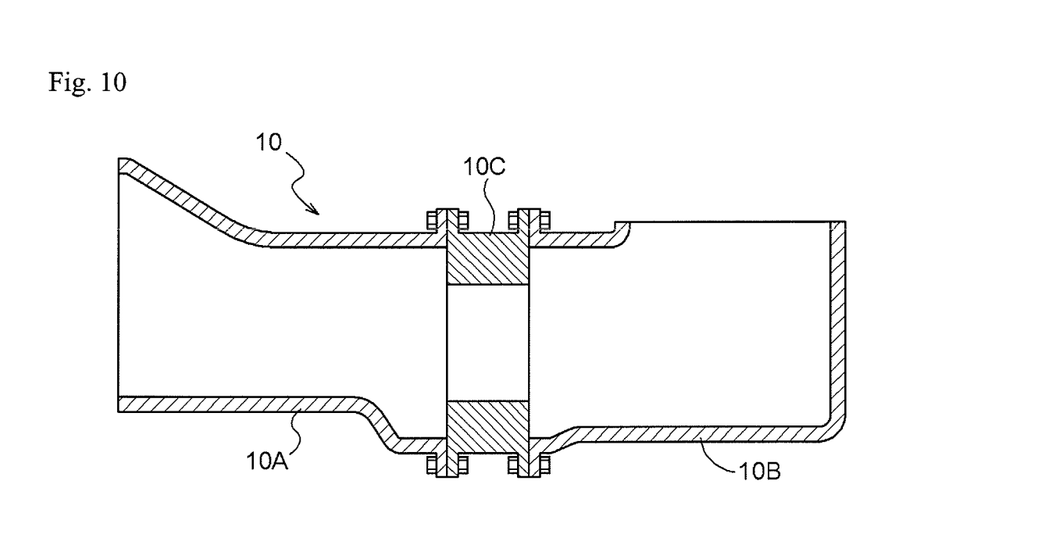
FIG. 10 is a schematic vertical cross-section of a left lateral view illustrating yet another configuration of a housing unit for heavy load tasks.

As shown in FIG. 10, an example of the middle housing 10C for heavy load tasks may be a middle housing formed so as to have a thicker wall thickness than that of the front housing 10A and the rear housing 10B for heavy load tasks. With this configuration, an increase to the weight of the vehicle appropriate to heavy load tasks such as bulldozing and towing can be further facilitated. In addition, an amount of oil stored within the housing unit 10 can be reduced while providing an appropriate oil level.

Although not shown in the drawings, an example of the middle housing 10C for heavy load tasks may also be a middle housing formed such that a lower half of the middle housing has a thicker wall thickness than that of the front housing 10A and the rear housing 10B for heavy load tasks. In this configuration also, an increase to the weight of the vehicle appropriate to heavy load tasks such as bulldozing and towing can be further facilitated. In addition, an amount of oil stored within the housing unit 10 can be reduced while providing an appropriate oil level.

Figure 11:
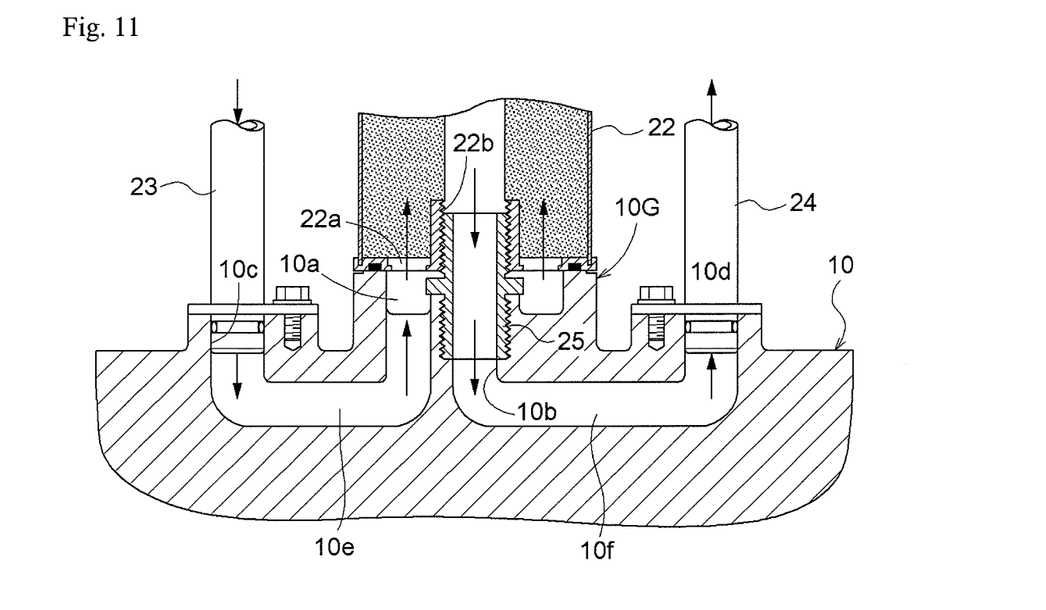
FIG. 11 is a lateral cross-section of a plan view of a relevant portion illustrating a configuration of an oil filter attachment portion of a housing unit.

As shown in FIG. 11, the housing unit 10 is integrally formed with an oil filter attachment portion 10G. The oil filter attachment portion 10G includes: a first junction port 10a connecting to an oil inlet 22a of an oil filter 22; a second junction port 10b connecting to an oil outlet 22b of the oil filter 22; a first connection port 10c enabling a connection with a first feed pipe 23, which connects to an oil output port (not shown in the drawings) formed at a predetermined position on the housing unit 10; a second connection port 10d enabling a connection with a second feed pipe 24, which connects to a hydraulic pump (not shown in the drawings); a first internal oil passage 10e running between the first junction port 10a and the first connection port 10c; and a second internal oil passage 10f running between the second junction port 10b and the second connection port 10d. In addition, by connecting the oil outlet 22b of the oil filter 22 to the second junction port 10b via a nipple 25, the configuration enables attaching the oil filter 22 at a predetermined position of the housing unit 10.

Based on the above-noted configuration, by attaching the oil filter 22 to the oil filter attachment portion 10G, and also by connecting the first feed pipe 23 (connected to the oil output port of the housing unit 10) to the first connection port 10c and connecting the second feed pipe 24 (connected to the hydraulic pump) to the second connection port 10d, the housing unit 10 can form a suction intake oil passage running from the oil output port to the hydraulic pump.

In addition, a location on the housing unit 10 where the oil filter attachment portion 10G is provided can be readily changed in a design through changing a placement of a nesting piece, core piece, or the like for molding the attachment portion, which are used when each of the housings 10A to 10F are cast. Specifically, despite having a configuration in which the oil filter attachment portion 10G is formed integrally with the housing unit 10, a degree of freedom in positioning the oil filter 22 can be increased.

Other Embodiments (1) The front axle frame 7 may be made of die cast aluminum or the like.

(2) The shape of the front axle frame 7 can be variously modified in response to a required degree of strength, a required weight, and the like. For example, the front axle frame 7 may have a shape that does not include the hydraulic pipe openings 7Db. In addition, the front axle frame 7 may be formed to be rectangular in a plan view and a flat cube.

(3) The front axle frame 7 may be configured so as to support the front axle case 6 in a fixated state with the support portions 7Da of the bottom 7D.

INDUSTRIAL APPLICABILITY

The present invention can be applied to a tractor having a front axle frame supporting a front axle case.

DESCRIPTION OF REFERENCE NUMERALS

6 Front axle case
7 Front axle frame
7D Bottom
7Da Support portion
20 Support shaft
21 Holder

The invention claimed is:

1. A tractor having a front axle frame supporting a front axle case,
   wherein the front axle frame is configured as a cast metal member having one or more support portions on a bottom of the front axle frame, the one or more support portions supporting the front axle case,
   wherein the one or more support portions project from a surface of the bottom of the front axle frame,
   wherein the front axle case includes a front/back-oriented support shaft rotatably supported by front and rear holders, and
   wherein the front axle frame is long in a front/back direction, spanning the front and rear holders, and
   wherein the one or more support portions include a front support portion at the front of the front axle frame and a rear support portion at the rear of the front axle frame, and the front axle frame is configured to support the front axle case with the front and rear support portions, via the front and rear holders.

2. The tractor according to claim 1, wherein the front support portion and the rear support portion are configured for threaded engagement with the front and rear holders, respectively.

3. The tractor according to claim 1, wherein the front axle frame comprises a side wall, and wherein the front support portion and the rear support portion project beyond the side wall.

4. The tractor according to claim 1, wherein the front support portion and the rear support portion project downwardly from the surface of the bottom of the front axle frame to a same extent.

* * * * *